United States Patent
Kobayashi et al.

[11] 3,794,900
[45] Feb. 26, 1974

[54] PULSE INTERPOLATION SYSTEMS

[75] Inventors: Kengo Kobayashi, Kawasaki; Yoshiaki Kato, Tokyo, both of Japan

[73] Assignees: Fujitsu Limited; Fujitsu Fanuc Limited, both of Tokyo, Japan

[22] Filed: Sept. 7, 1972

[21] Appl. No.: 286,884

[30] Foreign Application Priority Data
Sept. 13, 1971  Japan................................ 46-71423

[52] U.S. Cl............. 318/603, 318/696, 235/151.11
[51] Int. Cl............................................ G05b 19/28
[58] Field of Search........ 318/603, 696; 235/151.11

[56] References Cited
UNITED STATES PATENTS

| | | | |
|---|---|---|---|
| 3,700,993 | 10/1972 | Fischer............................ | 318/603 |
| 3,465,217 | 9/1969 | Kress............................... | 318/603 X |
| 3,473,098 | 10/1969 | Waller............................. | 318/603 X |
| 3,467,902 | 9/1969 | Shimizu et al................... | 318/696 |
| 3,624,517 | 11/1971 | Kobayashi....................... | 318/48 X |

*Primary Examiner*—B. Dobeck
*Attorney, Agent, or Firm*—Maleson, Kimmelman and Ratner

[57] ABSTRACT

Pulse interpolation system for fast and accurate numerical control of machine tools, having a small scale computer with software which processes and sends out the numerical command; counting means which memorizes said numerical command, the content of said counting means being added or subtracted from each interpolation pulse, and; a pulse generator circuit which provides interpolation pulses from the time when said counting means memorizes said numerical command until the content of said counting means reaches the predetermined value, e.g., zero.

6 Claims, 6 Drawing Figures

Fig. 4
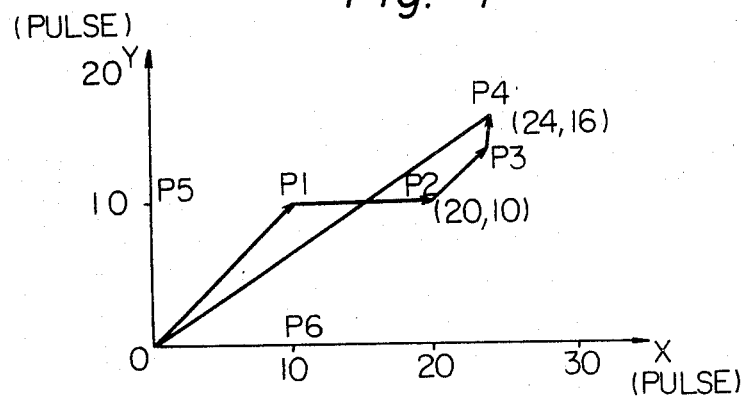
Fig. 5
| STEP | X | Y |
|---|---|---|
| 1 | 10 | 10 |
| 2 | 10 | 0 |
| 3 | 4 | 6 |
Fig. 6
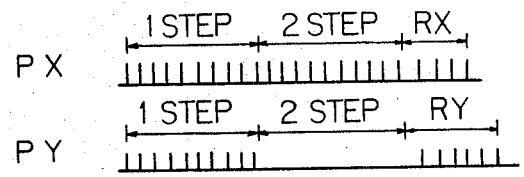

PULSE INTERPOLATION SYSTEMS

The present invention relates to a pulse interpolation system which gives high speed interpolation pulses in accordance with the pulse interpolation comand from a computer, particularly from a small scale computer.

There have been two kinds of numerical control machine tools (NC) which operate in accordance with given numerical data. One is a positioning system and the other a contouring control system. Both systems operate by interpolation pulses in accordance with the numerical command information; their driving means, such as a pulse motor, operates in accordance with the interpolation pulses. To improve the accuracy of manufactured products, more interpolation pulses are needed. Said numerical command information may be given by a small scale general purpose computer, and if the speed of interpolation pulses is low, said computer may also give even interpolation pulses. However, in the prior art system wherein the computer provides interpolation pulses directly, said small scale general purpose computers can not give high speed interpolation pulses. The maximum limit of the speed of interpolation pulses by said computers is less than 4 KHz. Therefore it is not easy to attain accurate control of a numerical control machine tool (NC) controlled by a small scale general purpose computer.

The purpose of the present invention is to provide a system which overcomes the above-mentioned drawbacks.

Another object of the present invention is to provide an improved system which supplies high speed interpolation pulses in accordance with numerical command from a small scale computer.

A further object of the present invention is to provide a pulse interpolation system for an improved 2 or more axis numerical control machine tool.

Still another object of the present invention is to provide a pulse interpolation system which enables the pulse motor to trace smoothly without miss-tracing even for intermittent interpolation pulses.

The pulse interpolation system according to the present invention comprises a small scale program control computer which processes and sends out the numerical command; counting means which memorizes said numerical command, the content of said counting means being added or subtracted from each interpolation pulse, and; a pulse generator circuit which provides interpolation pulses from the time when said counting means memorizes said numerical command until the content of said counting means reaches the predetermined value, e.g., zero.

Further features and advantages of the present invention will be apparent from the ensuing description with reference to the accompanying drawings to which, however, the scope of the invention is in no way limited.

FIG. 4 shows one embodiment of the tracing of 2-axis type contour control system;

FIG. 5 shows a pre-set command for the trace of FIG. 4, and;

FIG. 6 shows the time-chart of interpolation pulses for the trace of FIG. 4.

Figure 1:
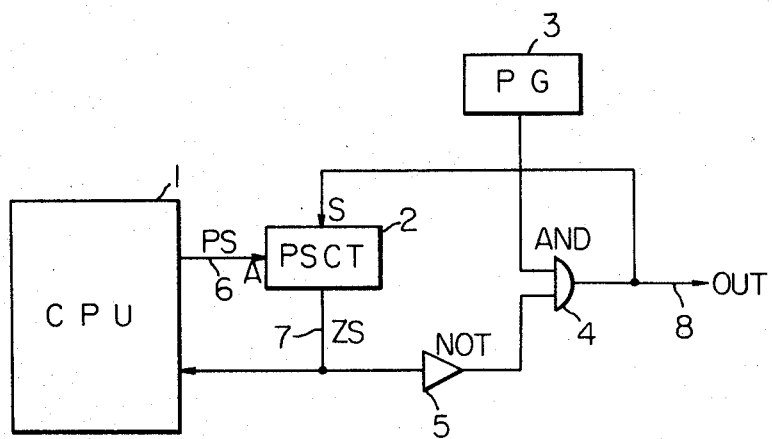
FIG. 1 is a brief blockdiagram of one embodiment of the pulse interpolation system according to the present invention.

In FIG. 1, the pulse interpolation command from a computer or a central processing unit (CPU)1 is applied as pre-set command PS to a pre-set counter (SCT)2, which is set to a predetermined value by said pre-set command PS. The output of pulse generator circuit (PG)3 is applied to one input of AND circuit (AND)4. The zero detection signal ZS from the pre-set counter (PSCT)2 is applied through inverter (NOT)5 to the other input of AND circuit (AND)4. The zero detection signal ZS appears when the content of the pre-set counter (PSCT)2 reaches the predetermined value, e.g., zero. Therefore, when the pre-set counter (PSCT) is set to a certain value by the central processing unit (CPU)1, the signal ZS disappears, AND circuit (AND)4 opens and the output signal of pulse generator circuit (PG)3 appears at an output line (OUT)8 through AND circuit (AND)4 as the interpolation pulses. Said interpolation pulses are also applied to the other input of the pre-set counter (PSCT)2, the content of which is subtracted from each pulse so supplied thereto. When the content of said pre-set counter reaches the predetermined value e.g., zero, zero detection signal ZS closes AND circuit (AND)4. Thus the output signal from the pulse generator circuit (PG)3 is inhibited. The zero detection signal ZS is also applied to the central processing unit (CPU)1, which then processes the next pulse interpolation job, and supplies the next pulse interpolation command or pre-set command PS to the pre-set counter (PSCT)2.

Suppose that the content of pre-set counter (PSCT)2 is set to $n$, the content of said pre-set counter (PSCT)2 reaches zero after interpolation pulses appear n times. Therefore the number of interpolation pulses are n times as many as that of pulse interpolation command from central processing unit (CPU)1. Though a small scale computer or mini-computer is able to supply interpolation pulses up to 4 KHz, the pulse interpolation system according to the present invention may easily supply interpolation pulses of 10 times as many as those by a mini-computer. Thus more accurate control of a numerical control machine tool (NC) is attained using a small scale computer for the process and calculation of interpolation pulses and pulse interpolation command.

Figure 2:
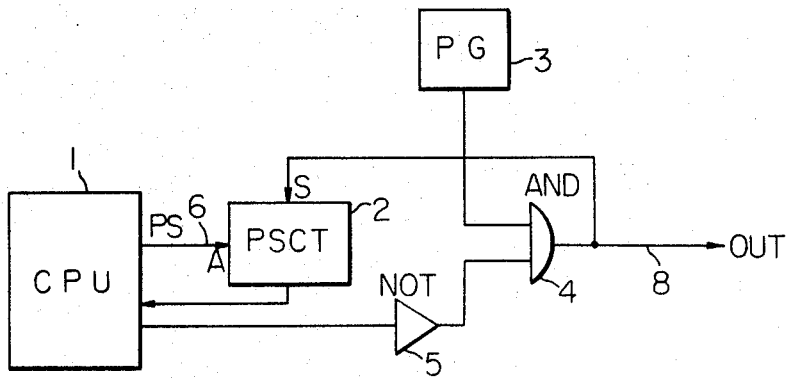
FIG. 2 is a brief blockdiagram of the other embodiment of the pulse interpolation system according to the present invention.

FIG. 2 shows the other embodiment of the pulses interpolation system according to the present invention. In FIG. 2 the pulse interpolation command from a central processing unit (CPU)1 is applied (as a pre-set command PS) to an input of pre-set counter (PSCT)2. The other output of a central processing unit (CPU)1 is connected through an inverter (NOT)5 to one input of AND circuit (AND)4. The output of pulse generator circuit (PG)3 is connected to the other input of AND circuit (AND)4, the output of which is connected to an output line (OUT)8 as well as the second input of said pre-set counter (PSCT)2. The output of pre-set counter (PSCT)2 is connected to an input of central processing unit (CPU)1 and, therefore, the central processing unit (CPU)1 may read the content of pre-set counter (PSCT)2.

In FIG. 2, just when central processing unit (CPU)1 sends the information about the number of interpolation pulses to pre-set counter (PSCT)2 and a signal indicating zero to an inverter (NOT)5, the output signal of pulse generator circuit (PG)3 is applied to output line (OUT)8 through AND circuit (AND)4. The output of AND circuit (AND)4 is also applied to a subtract input S of pre-set counter (PSCT)2. Thus the content of pre-set counter (PSCT)2 is subtracted from each interpolation pulse sent to output line (OUT)8. The content of pre-set counter (PSCT)2 is read by central processing unit (CPU)1. Said central processing unit (CPU) is so programed that it examines the content of pre-set counter (PSCT)2, and that the output signal indicating zero applied to inverter (NOT)5 stops just when said content of said counter 2 reaches a predetermined value, for instance zero. That is to say, the state that the content of counter 2 is detected as zero by central processing unit (CPU)1, which then closes AND circuit (AND)4 through inverter (NOT)5, and thus the operation of pulse interpolation stops. As a result, the number of interpolation pulses applied to output line (OUT)8 is the same as that of the binary number applied to pre-set counter (PSCT)2 from central processing unit (CPU)1. As the software of central processing unit (CPU)1 processes the content of preset counter (PSCT)2, it is easy to modify the predetermined value which is to be detected.

Figure 3:
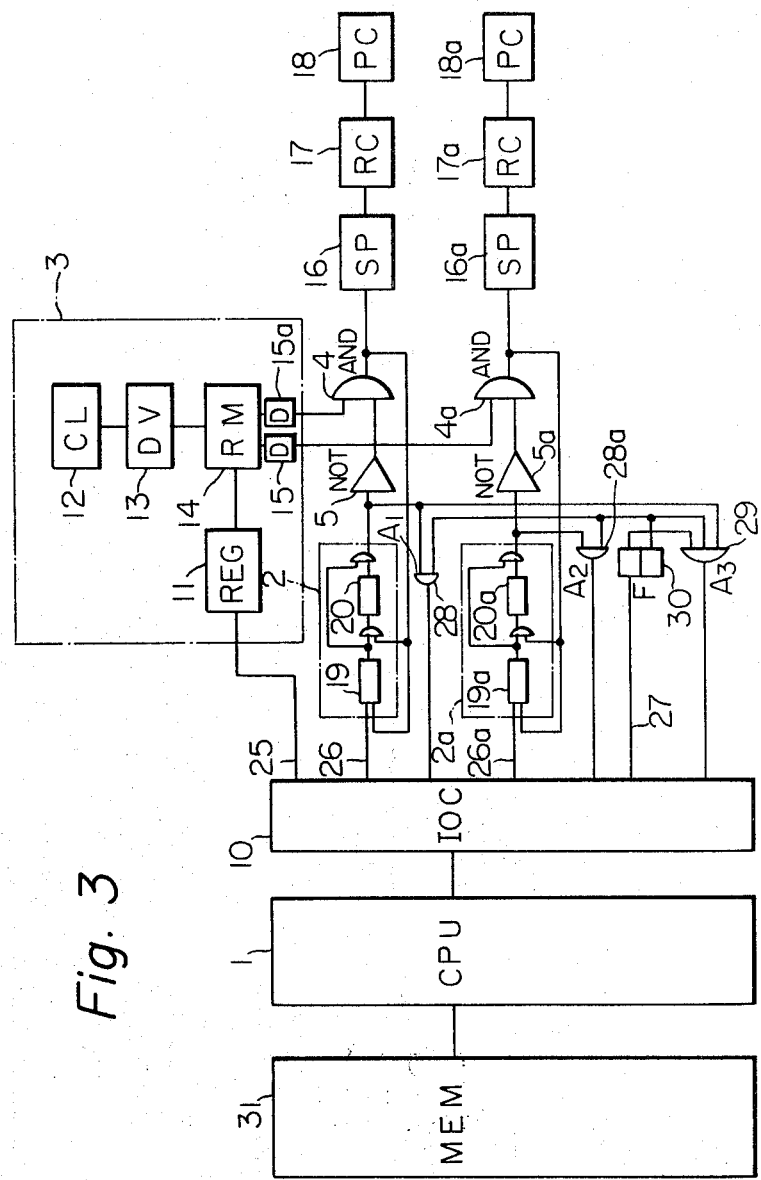
FIG. 3 is a detailed blockdiagram of the pulse interpolation system of FIG. 1.

FIG. 3 shows the detailed blockdiagram of the embodiment FIG. 1, and it shows the embodiment of 2 CH type or 2 spindle type for the sake of argument. In FIG. 3, all inputs and outputs of central processing unit (CPU)1 are connected through input-output control unit (IOC)10 to external devices. The first output 25 of input-output control unit (IOC)10 is connected to an input of register 11 of pulse generator circuit 3. The output of said register 11 is connected to one input of rate-multiplier (RM)14. The output of clock oscillator (CL)12 is connected through divider (DV)13 to the second input of rate-multiplier (RM)14. The output of rate-multiplier (RM)14 is connected to one input of AND circuits (AND)4 and 4a through dividers (D)15 and 15a, respectively. The second output 26 of input-output control unit (IOC)10 is connected through a series circuit of pre-set counter 2 and inverter (NOT)5 to the other input of AND circuit (AND)4. The third output 26a of input-output control unit (IOC)10 is connected through a series circuit of pre-set counter 2 and inverter (NOT)5 to the second input of AND circuit (AND)4a. Pre-set counters 2 and 2a comprise eight bits which have a pair of integrated circuits of four bits counter 19, 20 and 19a, 20a respectively. Up binary counter 9316 manufactured by Fairchild Co., Ltd. in U. S. A. may be used as four bits counter 19, 19a, 20, and 20a, and in this case two inputs and output signals indicating that the content of a counter is zero are obtained. The output of AND circuit (AND)4 is connected to the input of speed up circuit (SP)16, and the second input of pre-set counter 2. The output of said speed up circuit (SP)16 is connected through a ring counter (RC)17 to a pulse motor control (PC)18. Similarly the output of AND circuit (AND)4a is connected to the input of speed up circuit (SP)16a, and the second input of pre-set counter 2a. The output of said speed up circuit (SP)16a is connected through a ring counter (RC)17a to a pulse motor control (PC)18. Further, the output of pre-set counter 2 is connected to the first inputs of AND circuit $(A_1)$28 and AND circuit $(A_3)$29a, and the output of pre-set counter 2a is connected to the first input of AND circuit $(A_2)$28a and the second input of AND circuit $(A_3)$29, third input of AND circuit $(A_3)$29 is connected to the normal output of flip-flop (F)30. The reverse output of flip-flop (F)30 is connected to the second input of AND circuit $(A_1)$28, the second input of AND circuit $(A_2)$28a, and the third input of AND circuit $(A_3)$29. The fourth output 27 of input-output control unit (IOC)10 is connected to the trigger input of flip-flop (F)30. The outputs of AND circuits $(A_1)$28, $(A_2)$28a, and $(A_3)$29 are connected to the input of input-output control (IOC)10. Of course the central processing unit (CPU)1 is connected to the memory unit (MEM)31.

The operation of the pulse-interpolation system of FIG. 3 will be hereafter explained.

Clock oscillator (CL)12 provides a pluse signal of high repetition cycle, which is converted to a predetermined lower repetition cycle through divider (DV)13. The output pulse signal of divider (DV)13 is further converted by rate multiplier (RM)14 to another repetition cycle. The rate of said conversion is determined by central processing unit (CPU)1 through register (REG)11. For instance, suppose central processing unit (CPU)1 gives the register (REG)11 the number N, then the output frequency of the pulse signal from rate multiplier (RM)14 is N·$\alpha$ times as high as the input frequency thereto, where $\alpha$ is a constant ratio of (RM)14. The output pulse signal of rate multiplier (RM)14 is applied to one input of AND gates (AND)4 and 4a through dividers (D)15 and 15a respectively. Dividers (D)15 and 15a converts the frequency of pulse signal to the most suitable frequency for each spindle of numerical control machine tool (NC). On the other hand binary signals from central processing unit (CPU)1 are applied to inputs of pre-set counters 2 and 2a, through lines 26 and 26a, respectively. This causes the content of pre-set counter 2 to become non zero and the output of said pre-set counter 2 opens AND gates 4 and 4a through inverters 5 and 5a, respectively. Therefore the output pulse signal of pulse generator circuit 3 appears at the output of AND gates 4 and 4a. This output pulse signal is also applied to the inputs of pre-set counters 2 and 2a. In this case, supposing that pre-set counters 2 and 2a are constituted of integrated circuits of up binary counters like Fairchild 9316, the content of said pre-set counters 2 and 2a are added from each feedback pulse signal from the output of AND circuits 4 and 4a.

In the case of 1-axis type control, the flip-flop (F)30 is controlled to reset or zero condition. Therefore pre-set counter 2 or 2a applies the output signal through AND circuit $(A_1)$28 or $(A_2)$28a, and input-output control (IOC)10, to central processing unit (CPU)1, demanding the next command, when the content of each pre-set counter 2 or 2a reaches predetermined value, e.g., zero.

In case of 2-axis type control, the flip-flop (F)30 is controlled to set or one condition. Therefore AND circuit $(A_1)$28 and $(A_2)$28a close, and AND circuit $(A_3)$29 opens. AND circuit $(A_3)$29 provides the output signal to central processing unit (CPU)1, demanding the next command, when pre-set counters 2 and 2a reach the predetermined value, e.g. zero, at the same time. Accordingly the central processing unit may send the pre-set command whenever the output of AND circuit $(A_3)$29 is provided, which simplifies the structure of software of central processing unit. Said software is, of course, stored in memory unit (MEM)31.

It does not matter if counters 2 and 2a are up binary type or down binary type. If the counters are up binary type, it is sufficient that said counters are given a complementary number instead of positive number. When the content of pre-set counter 2 or 2a reaches zero, the output signal indicating the content is zero appears, and this output signal closes AND circuit 4 or 4a through inverter 5 or 5a. Thus the operation of pulse interpolation stops. On the other hand, the output pulse signal of AND circuit 4 or 4a is applied to the input of speed up circuit (SP)16 or 16a respectively, where the desnity of the pulse signal is adjusted. The detailed explanation of speed up circuit (SP)16 and 16a is given in the U.S. Pat. No. 3,624,517, filed by the present applicant. The output of speed up circuit 16 or 16a is applied to ring counter (RC)17 or 17a, respectively. Ring counters (RC)17 and 17a decide and control the direction and amplitude of the current which is to be applied to each exciting pole of the pulse motors according to input pulse signal. The detailed explanation of ring counters (RC)17 and 17a is given in the U. S. Pat. No. 3,467,902 filed by the present applicant. The output signals of ring counters (RC)17 and 17a are applied to the pulse motors through pulse motor control units (PC)18 and 18a, respectively.

FIG. 4 shows the embodiment of contouring type trace curve of a 2-axis numerical control machine tool. Suppose that number 10 is set to pre-set counters 2 and 2a in FIG. 3 and point $P_4$ (24, 16) which coordinates are 24 pulses in the X direction and 16 pulses in the Y direction is traced. As interpolation pulses for both axis are applied for every 10 pulses, the central procesing unit (CPU)1 divides the numerical objective data (24, 16) into (20, 10) and (4, 6), where $24 = 10 \times 2 + 4$, and $16 = 10 \times 1 + 6$, and these data are stored in memory unit (MEM)31. Then the fist decision is made as to how to go to point $P_2$ (20, 10) in the condition that the trace error is less than predetermined value. There are three courses to point $P_2$, that is, through $P_1$ (10, 10), $P_5$ (0, 10), or $P_6$ (10, 0). In the case of FIG. 4, the course $O-P_1-P_2$ is used, and the pre-set command of FIG. 5 is provided. In FIG. 5, the first step is to go to $P_1$ (10, 10) from . (0, .), and 10 pulses in the X direction and 10 pulses in the Y direction are provided. The second step is to go to $P_2$ (20, 10) from $P_1$ (10, 10), and 10 pulses in the X direction are provided. The third step is to go to $P_4$ (24, 16) from $P_2$ (20, 10) through $P_3$ (24, 14), and 4 pulses in the X direction and 6 pulses in the Y direction are provided. In the third step point $P_3$ (24, 14) must be passed instead of going directly to $P_4$ (24, 16), if the frequencies of the interpolation pulses of the X axis and the Y axis are the same.

FIG. 6 shows the actual interpolation pulses. In FIG. 6, PX is the output signal of AND circuit 4, and PX has 24 pulses (10 pulses in first step, 10 pulses in second step and 4 pulses in third step). PY is the output signal of AND circuit 4a, and PY has 16 pulses (10 pulses in first step and 6 pulses in third step). SPX and SPY are output signals of the speed up circuit (SP)16 and 16a. SPX and SPY have the same quantity of pulses as PX and PY, respectively, but the interval of them is smoothed by the speed up circuit (SP).

Though FIG. 3 and FIG. 4 show the embodiment of 2-axis type, which controls two machine parts at the same time, it is obvious that a pulse interpolation system with more than 3-axis type is possible within the spirit of the present invention for those skilled in the art. Further down binary counters in the form of integrated circuits are possible for pre-set counters 2 and 2a, as well as up binary counters. Additionally, a signal by manual operation could be applied to register (REG)11 through an analog-digital converter, instead of the digital signal from central processing unit (CPU)1.

The embodiments of FIG. 1, FIG. 2 and FIG. 3 are pre-set counter (PSCT)2. However, a register means could be used instead of pre-set counter. Said register means records the pulse interpolation command from central processing unit, and the content of said register means is added or subtracted from each output interpolation pulse from pulse generator circuit, said content of register means reaches a predtermined value, the interpolation pulse signal from the pulse generator circuit is inhibited by a gate circuit. That is to say, the content of the register means, as well as above-mentioned pre-set counter, is first set to a certain value and its content is subtracted from each interpolation pulse until the content reaches a predetermined value, e.g., zero, and then AND circuit is closed. Or, its content is added from each interpolation pulse until the content reaches a predetermined value, e.g., zero, and then AND circuit is closed.

As explained above, the pulse interpolation system according to the present invention has a calculation means which is actually a pre-set counter or register means. In case said calculation means is a pre-set counter, the information from the central processing unit is set at first in said pre-set counter. If said calculation means is register means, the information from the central processing unit is recorded in said register means. The pre-set or record of the information into said calculation means initiates the output of interpolation pulse from pulse generator circuit. The content of the pre-set counter or register means is added or subtracted from each interpolation pulse until said content reaches a predetermined value, e.g., zero, and then the output of interpolation pulse stops. Accordingly more frequent interpolation pulses than the pulse interpolation command from the central processing unit are available. This makes it possible to use a small scale computer or central processing unit in this accurate pulse interpolation system. Further the pulse interpolation system according to the present invention has the feature that the structure of circuits is relatively simple.

The foregoing description has been given for clarity of understanding only, and no unnecessary limitations should be understood therefrom as modifications will be obvious to those skilled in the art.

What is claimed is:

1. A pulse interpolation apparatus for numerical control comprising:

a a control computer programmed to compute an interpolation computation to obtain a pre-set command;

b a pulse generator circuit providing pulse signals;

c counter means having a first input connected to said control computer and being pre-set to a first predetermined value by said pre-set command;

d gate means having one input connected to the output of said pulse generator and another input connected to the output of said counter means, said gate means supplying the output pulses of said pulse generator circuit as output interpolation pulses; and e feedback means applying the output of said gate means to the second input of said counter means to reduce the content of said counter means; whereby said gate means inhibits output interpolation pulses and said control computer is interrupted to compute again the interpolation computation when the content of said counter means reaches a second predetermined value.

2. A pulse interpolation system according to claim 7, wherein said central processing unit finds the condition that the content of said counting means reaches the second predetermined value.

3. A pulse interpolation system according to claim 7, wherein said counting means finds the condition that the content thereof reaches the second predetermined value.

4. A pulse interpolation system according to claim 7, wherein said second predetermined value is zero.

5. A pulse interpolation system according to claim 7, further comprising counter means for each axis, and means to detect the condition that the content of all counter means reaches said second predetermined value.

6. A pulse interpolation system according to claim 7, wherein said interpolation pulses are applied through speed up circuit to pulse motors.

* * * * *

PO-1050
(5/69)

UNITED STATES PATENT OFFICE
CERTIFICATE OF CORRECTION

Patent No. 3,794,900                     Dated  February 26, 1974

Inventor(s)   K. Kobayashi et al

It is certified that error appears in the above-identified patent and that said Letters Patent are hereby corrected as shown below:

In claims 2-6, line 1, change "7" to -- 1 --.

Signed and sealed this 19th day of November 1974.

(SEAL)
Attest:

McCOY M. GIBSON JR.
Attesting Officer

C. MARSHALL DANN
Commissioner of Patents